United States Patent [19]

Gellermann et al.

[11] Patent Number: 6,106,606
[45] Date of Patent: Aug. 22, 2000

[54] SPHERICAL PARTICLES ON THE BASIS OF METAL OXIDES, METHOD FOR ITS MANUFACTURE AND ITS UTILIZATION

[75] Inventors: Carsten Gellermann, Würzburg; Herbert Wolter, Gerchsheim; Werner Storch, Höchberg, all of Germany

[73] Assignee: Fraunhofer-Gesellschaft zur Förderung der angewandten Forschung e.V., Germany

[21] Appl. No.: 08/960,447

[22] Filed: Oct. 29, 1997

[30] Foreign Application Priority Data

Oct. 29, 1996 [DE] Germany .......................... 196 43 781

[51] Int. Cl.$^7$ .................................. C09C 3/12; C09C 1/00
[52] U.S. Cl. ........................ 106/441; 428/403; 428/405; 427/213.3; 427/220
[58] Field of Search ............................ 106/441; 423/618, 423/593; 428/403, 405; 427/213.3, 220

[56] References Cited

U.S. PATENT DOCUMENTS

| | | | |
|---|---|---|---|
| 4,567,030 | 1/1986 | Yuasa et al. | 106/481 |
| 4,911,903 | 3/1990 | Unger et al. | 423/335 |
| 5,023,071 | 6/1991 | Sherif | 423/592 |
| 5,139,766 | 8/1992 | Castellano et al. | 423/608 |
| 5,202,209 | 4/1993 | Winnik et al. | 430/106.6 |
| 5,484,766 | 1/1996 | Shah et al. | 423/593 |
| 5,575,940 | 11/1996 | Lofftus | 252/62.63 |
| 5,618,872 | 4/1997 | Pohl et al. | 524/430 |
| 5,695,901 | 12/1997 | Selim | 430/106.6 |

FOREIGN PATENT DOCUMENTS

| | | |
|---|---|---|
| 4219287 | 12/1993 | Germany . |
| 6-218276 | 8/1994 | Japan . |

OTHER PUBLICATIONS

Derwent abstract 87–087995 of EP 0 216 278 and US 4,911,903 (Apr. 1987).

Pillai, V. et al., "Synthesis of high–coercivity cobalt ferrite particles using water–in–oil microemulsions", Journal Magnetism and Magnetic Materials, 163 (Oct. 1996) pp. 243–248.

Pillai, V. et al., "Magnetic properties of barium ferrite synthesized using a microemulsion mediated process", Journal Magnetism and Magnetic Materials, 163 (Jul. 1992) pp. L299–L304.

Bandow et al., "Magnetic Properties of Magnetite Ultrafine Particles Prepared by W/O Microemulsion Method", Japan Journal of Applied Physics, vol. 26, No. 5 (May 1987) pp. 713–717.

Japanese Laid–Open Publication SHO–59/193,936 (Nov. 1984).

Japanese Laid–Open Patent Publication HEI–06/218,276 (Aug. 1994).

*Primary Examiner*—C. Melissa Koslow
*Attorney, Agent, or Firm*—Young & Basile, P.C.

[57] ABSTRACT

The invention relates to spherical particles having a size between 5 and 10,000 nm and containing either $SnO_2$ or $SnO_2$ and at least one further oxide of the elements from the $1^{st}$ to fifth main groups and/or the transitional metals, the oxides also being capable of containing organic groups. A particle surface is modified with organic groups and a $SnO_2$ content of the particles lies between 0.1 and 99% by weight.

27 Claims, No Drawings

SPHERICAL PARTICLES ON THE BASIS OF METAL OXIDES, METHOD FOR ITS MANUFACTURE AND ITS UTILIZATION

BACKGROUND OF THE INVENTION

1. Field of the Invention

The invention relates to spherical particles on the basis of metal oxides, and to a method for its manufacture and its utilisation.

2. Brief Description of Relevant Art

Spherical particles on the basis of metal oxides are widely used in a variety of industrial fields. Thus they are used for example for manufacturing bulk materials, coatings, films or fibres, to produce optical, electro-optical or opto-electronic components, in chromatography, as fillers or as carriers e.g. for pharmacological active ingredients.

In many fields, the suitability of spherical particles depends, in large part on particle size, particle size distribution and surface quality. Surface quality, for example, is important in situations when the particles are to be used as fillers, when they are introduced into a matrix or when they are used as carriers or in chromatography. Efforts have been made to develop methods for manufacturing and surface modification of spherical particles. The resulting particles have a narrow particle size distribution. In such situations, the particle size can be deliberately controlled and adapted to the respective requirements of the particular end use. Similarly, the surface qualities can be modified in a controlled manner.

Furthermore, when using the spherical particles as fillers, i.e. after intermingling them in a matrix, efforts have been made to precisely adjust the more variable composition parameters, such as the modulus of elasticity, refractive index, impact resistance, X-ray opacity, coefficient of thermal expansion, permeability, etc. There are also requirements for improved inorganic fillers for use in polymeric or polymerisable systems, particularly when embedded in compounds for optical, electro-optical, and opto-electronic components.

Inorganic fillers are known from DE 42 19 287 A1, which teaches monodisperse non-porous, sphere-shaped particles based on $SiO_2$, $TiO_2$, $ZrO_2$, $Al_2O_3$, $V_2O_5$, $Nb_2O_5$ or mixed systems thereof. This reference also discusses surface modification by means of covalently bonded organic groups.

A disadvantage in the fillers as disclosed in DE 42 19 287 A1 is that these fillers lack a satisfactory degree of X-ray opacity. In many situations however an excellent refractive index and good X-ray opacity are important. An unfavourable factor in these fillers is that a maximum of 25% of filler can be introduced. Because of this, the characteristics of the material are substantially determined by the matrix and not by the filler. This results in a relatively high degree of shrinkage and thermal expansion.

When materials such as these are used as dental material, it is advantageous that the fillers used should have a contact toxicity which does not exceed specified predetermined limits, as is the case with amalgam. This cannot be achieved with previously known materials and compounds of such materials.

SUMMARY OF THE INVENTION

The object of the present invention is to prepare spherical particles based on metal oxides, which have a narrow range of particle size distribution and have a particle size and surface property modified in a controlled manner to meet the requirements of the respective end use. In particular it is the object of the present invention to prepare mixed particle materials, i.e. particles that consist of at least two metal oxides, with the aforementioned properties. In particular the mixed particle materials are provided with an organic surface modification. Additionally, when used as fillers, i.e. after intermingling in a matrix, the spherical particles of the present invention are capable of enabling the most varied composite parameters such as, for example, modulus of elasticity, refractive index, impact resistance, X-ray opacity, coefficient of thermal expansion, permeability, etc. to be exactly adjusted. Also, the monodisperse particles, when used as fillers, permit production of material with high solids content and reduced shrinkage. The surface modification also improves the dispersal behaviour in organic media and reduces the tendency of the particles to agglomerate and accumulate as sediment. Additionally, the refractive index of the particles prepared in accordance with the teaching of the present application is adapted to conform with the refractive index of the organic matrix.

It is further the object of the present invention to provide methods for manufacturing the above-named particles. These methods are intended to be simple, cost-effective and universally usable.

The spherical particles of the present invention have the following features: a size between 5 and 10,000 nm, preferably between 20 and 2000 nm; contain $SnO_2$ and, if applicable, one or more oxides of the elements of the first to fifth main group and/or of the transitional metals; the surface of the particles is modified with organic groups; and the $SnO^2$ content of the particles is between 0.1 and 99.9%, with 10–90% being preferred by weight.

The range of $SnO_2$ content is, preferably, between 10 to 90% by weight, if other oxides are present. Thus at least one further oxide of the elements of the first to fifth main group and/or of the transitional metals may be contained and so disposed that an onion-skin-like construction of the particles results. However, one or a plurality of these oxides may also be embedded in a matrix comprising one or more metal oxide(s). A homogenous structure is also possible.

The particles according to the invention can have surface modification. This is obtained by partial or total hydrolytic condensation of either one or a plurality of hydrolytically condensable compounds of silicon and, if applicable, other elements selected from the group B, Al, P, Sn, Pb, transitional metals, lanthanides, and actinides precondensates derived from the above-named compounds, and mixtures thereof. The hydrolytic condensation can occur, if necessary, in the presence of a catalyst and/or of a solvent by the action of water or moisture.

DETAILED DESCRIPTION OF THE INVENTION

In the present invention, the individual or plurality of hydrolytically condensable compounds of silicon and, if applicable, other elements from the group consisting of B, Al, P, Sn, Pb, Sr, Rb, Sb, transition metals, lanthanides, actinides, precondensates derived from the above-named compounds and mixtures thereof may be derived from various monomers. The general formulae for such examples is named in the following:

1.

$$R_a(Z'R'')_b MX_{c-(a+b)} \tag{I}$$

in which the radicals and indices have the following meaning:

R=alkyl, alkenyl, aryl, alkylaryl, or arylalkyl;

R"=alkylene, or alkenylene, these residues optionally containing oxygen-, sulphur atoms and/or amino groups;

x=hydrogen, halogen, hydroxy, alkoxy, acyloxy, alkylcarbonyl, alkoxycarbonyl or NR'2, with R'=hydrogen, alkyl or aryl;

Z'=halogen or a substituted amino-, amide-, aldehyde-, alkylcarbonyl-, carboxy-, mercapto-, cyano-, alkoxy-, alkoxycarbonyl-, sulphonic acid-, phosphoric acid-, acryloxy-, methacryloxy-, epoxy- or vinyl group;

a=0, 1, 2, 3, 4, 5, 6 or 7;

b=0, 1, 2, 3, 4, 5, 6 or 7; with a+b=1, 2, 3, 4, 5, 6 or 7;

c=1, 2, 3, 4, 5, 6, 7 or 8; and

M=elements of the 1st to 5th main group (CAS Version) or of the transitional metals with the main groups referring to alkali metals (IA), alkaline earth metals (IIA), boron group (IIIA), carbon groups (IVA) and nitrogen group (VA), with the preferred elements selected from the group consisting of silicon, aluminium, titanium, ytrium, zirconium, strontium, rubidium, vanadium and antimony.

1.1 Examples of Possible Organic Compounds:

1.1.1 $MeSi(OEt)_3$, $n-BuSi(OCH_3)_3$, $EtSi(OAC)_3$, $H_2N(CH_2)_3Si(OCH_3)_3$, $Etsi(OEt)_2$, $Si(OR)_4$ 1.1.2 $Al(OR)$, $Al(acetylacetonate)_3$, $EtAlCl_2$ 1.1.3 $Ti(OR)_4$, $TiCl_3$,

1.1.4 $Sb(OR)_3$, $SbCl_5$, $Ph_3SbCl_2$ 1.1.5 $YCl_3$, $Y(OCH_2CH_2OCH_3)_3$ 1.1.6 $Zr(OR)_4$, 1.1.7 $Sr\ (acetylacetonate)_2$, $Sr\ (OH)_2$ 1.1.8 $Rb(OAc)_2$, $Rb(acetylacetonate)_2$ 1.1.9 $VO(isopropovise)_3$, $V(acetylacetonate)_3$, $VCl_4$

2.

$$R_a(Z'R'')_bSnX_{c-(a+b)} \quad (II)$$

in which the radicals and indices have the following meaning:

R=alkyl, alkenyl, aryl, alkylaryl, or arylalkyl;

R"=alkylene, or alkenylene, these residues optionally containing oxygen-sulphur atoms and/or amino groups;

X=hydrogen, halogen, hydroxy, alkoxy, acyloxy, alkylcarbonyl, alkoxycarbonyl or NR'$_2$, with R'=hydrogen, alkyl or aryl; Z'=halogen or optionally a substituted amino-, amide-, aldehyde-, alkylcarbonyl-, carboxy-, mercapto-, cyano-, alkoxy-, alkoxycarbonyl-, sulphonic acid-, phosphoric acid, acryloxy-, methacryloxy-, epoxy- or vinyl group;

a=0, 1, 2, or 3;

b=0, 1, 2, or 3, with a+b=1, 2, or 3;

c=2, 4;

2.1 Examples of Organic Compounds with Sn $Sn(OR)_4$, $Sn(OR)_2$, $Bu_2Sn(OMe)_2$, $PhSnCl_3$

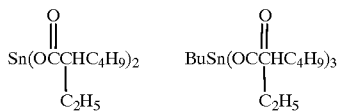

3.

$$R_a(Z'R'')_bSiX_{c-(a+b)} \quad (III)$$

in which the residues and indices have the following meaning:

R=alkyl, alkenyl, aryl, alkylaryl, or arylalkyl;

R"=alkylene, or alkenylenes, these residues optionally containing oxygen atoms, sulphur atoms, and/or amino groups;

X=hydrogen, halogen, hydroxy, alkoxy, acyloxy, alkylcarbonyl, alkoxycarbonyl, or NR'$_2$;

with R'=hydrogen, alkyl or aryl;

Z'=halogen or optionally a substituted amino-, amide-, aldehyde-, alkylcarbonyl-, carboxy-, mercapto-cyano-, alkoxy-, alkoxycarbonyl-, sulphonic acid-, phosphoric acid-, acryloxy-, methacryloxy-, epoxy- or vinyl group;

a=0, 1, 2, or 3;

b=0, 1, 2, or 3, with a+b=1, 2, or 3;

c=2 or 4.

4.

$$\{X_aR_bSi[(R'A)_c]_{(4-a-b)}\}_xB \quad (IV)$$

The radicals and indices can be equal or different, and can have the following meaning:

A=O, S, PR", POR", NHC(O)O or NHC(O)NR";

B=a straight-chained or branched organic residue, derived from a compound B' with at least one (for c=1 und A=NCH(O)O or NHC(O)NR") or at least two C=C double bonds and 5 to 50 carbon atoms;

R=alkyl, alkenyl, aryl, alkylaryl or arylalkyl;

R'=alkylene, arylene or alkylenearylene;

R"=hydrogen, alkyl or aryl;

X=hydrogen, halogen, hydroxy, alkoxy, acyloxy, alkylcarbonyl, alkoxycarbonyl or NR"$_2$;

a=1, 2 or 3;

b=0, 1 or 2 c=0 or 1;

X=a whole number, whose maximum value corresponds to the number of double bonds in the compound B' minus 1, or is equal to the number of double bonds in the compound B', if c=1 and A stands for NHC(C)O or NHC(O)NR"; the alkyl or alkenyl residues, optionally being substituted straight-chained, branched or cyclic residues with 1 to 20 carbon atoms, and being capable of containing oxygen-, sulphur-atoms and/or amino-groups, aryl groups such as, substituted phenyl, naphthyl or biphenyl and the above alkoxy-, acyloxy-, alkylcarbonyl-, alkoxy carbonyl-, alkylaryl-, arylalkyl-, arylene-, alkylene and alkylene aryl residues deriving from the above-defined alkyl- and aryl residues.

5. 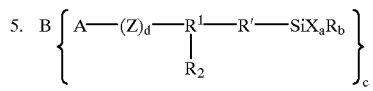 (V)

wherein the radicals and indices can be equal or different, and can have the following meaning:
B=a straight-chain or branched organic radical with at least one C=C double bond and 4 to 50 carbon atoms;
X=hydrogen, halogen, hydroxy, alkoxy, acyloxy, alkylcarbonyl, alkoxycarbonyl or $NR''_2$;
R=alkyl, alkenyl, aryl, alkylaryl or arylalkyl
R'=alkylene, arylene, arylene alkylene or alkylene arylene with respectively 1 to 10 carbon atoms, and these residues can contain oxygen-, sulphur atoms and/or amino groups;
R''=hydrogen, alkyl or aryl
A=O, S or NH when
d=1 and
Z=CO and
$R_1$=optionally, oxygen, sulphur atoms and/or alkylene, arylene or alkylene arylene containing amino groups, with respectively 1 to 10 carbon atoms; and
$R_2$=H or COOH or
A=O, S,NH or COO when
d=0 or 1 and
Z=CHR, with R=H, alkyl, aryl or alkylaryl, and
$R_1$=optionally oxygen-, sulphur atoms and/or alkylene, arylene or alkylene arylene containing amino groups, having 1 to 10 carbon atoms and
$R_2$=OH; or
A=S when
d=1 and
Z=CO and
$R_1$=N and
$R_2$=H;
a=1, 2 or 3;
b=0, 1 or 2, with a+b=3
c=1, 2, 3 or 4.

6. 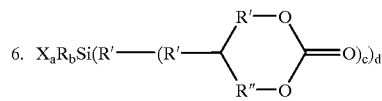 VI

The radicals and indices here being equal or different, and being capable of having the following meaning:
X=hydrogen, halogen, hydroxy, alkoxy, acyloxy, alkylcaronyl, alkoxycarbonyl or $NR^2_2$;
R=alkyl, alkenyl, aryl, alkylaryl or arylalkyl;
R'=alkylene, arylene, arylene alkylene or alkylene arylene having 0 to 1 carbon atoms, these residues optionally containing oxygen-, sulphur atoms and/or amino groups;
R''=alkylene, arylene, arylene alkylene or alkylene arylene and having 1 to 10 c-atoms, these residues optionally containing oxygen-, sulphur atoms and/or amino-groups;
$R^2$=hydrogen, alkyl or aryl;
a=1, 2 or 3;
b=0, 1 or 2, with a+b=1, 2 or 3;
c=1, 2, 3, 4, 5 or 6;
d=4−a−b.

7. $Y_nSiX_mR_{4-(n+m)}$ (VII)

the radicals being equal or different, and having the following meaning:
R=alkyl, alkenyl, aryl, alkylaryl or arylalkyl,
X=hydrogen, halogen, hydroxy, alkoxy, acyloxy, alkylcarbonyl, alkoxycarbonyl or $NR'_2$;
with R'=hydrogen, alkyl or aryl,
Y=a substituent, containing a substituted or unsubstituted 1,4,6-trioxaspiro -nonane radical;
n=1, 2 or 3,
m=1, 2 or 3, with n+m≦4.

8. 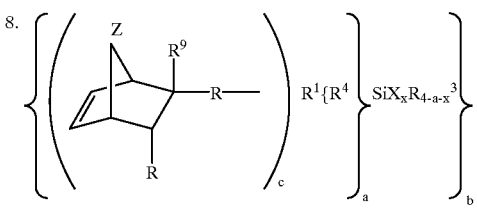 (VIII)

R=hydrogen, $R^2$—$R^1$—$R^4$—$SiXxR^3_{3-x}1$, carboxyl-, alkyl, alkenyl, aryl, alkylaryl or arylalkyl having 1 to 15 hydrocarbon atoms, these radicals optionally containing oxygen or sulphur atoms, ester, carbonyl, amide or amino groups;
$R^1$=alkylene, arylene, arylene alkylene or alkylarylene having 0 to 15 carbon atoms, these radicals optionally containing oxygen- or sulphur atoms, ester, carbonyl, amide or amino groups;
$R^2$=alkylene, arylene, arylene alkylene or alkylarylene having 0 to 15 carbon atoms, these radicals optionally containing oxygen or sulphur atoms, ester, carbonyl, amide or amino groups;
$R^3$=alkyl, alkenyl, aryl, alkylaryl or arylalkyl with having 1 to 15 carbon atoms, these radicals optionally containing oxygen or sulphur atoms, ester, carbonyl, amide or amino groups;
$R^4$=—(—$CHR^6$—$CHR^6$)$_n$—, with n=o or 1, —$CHR^6$—$CHR^6$S—$R^5$—, —CO—S—$R^5$—, $CHR^6$—$CHR^6$—$NR^6$—$R^5$, —Y—CS—NH—$R^6$—, —S—$R^5$, —Y—CO—NH—$R^5$, —CO—O—$R^5$—, —Y—CO—$C_2H_3$(COOH)—$R^5$—, —Y—CO—$C_2H_3$(OH)—$R^5$—or —Co—$NR^6$—$R^5$—;
$R^5$=alkylene, arylene, arylene alkylene or alkylarylene having 1 to 15 carbon atoms, these radicals optionally containing oxygen or sulphur atoms, ester, carbonyl, amide or amino groups;
$R^6$=hydrogen, alkyl or aryl with 1 to 10 carbon atoms;
$R^9$=hydrogen, alkyl, alkenyl, aryl, alkylaryl or arylalkyl having 1 to 15 carbon atoms, these radicals optionally containing oxygen or sulphur atoms, ester, carbonyl, amide or amino groups;
X=hydrogen, halogen, hydroxy, alkoxy, acyloxy, alkylcarbonyl, alkoxycarbonyl or $NR''_2$, with R''=hydrogen, alkyl or aryl;
Y=—O—, —S— or —$NR^6$—;
Z=—O— or —($CHR^6$)$_m$—, with m=1 or 2;

a=1, 2 or 3, with b=1 for a—2 or 3;
b=1, 2 or 3, with a=1 for b=2 or 3;
c=1 to 6;
x=1, 2 or 3;
a+x=2, 3 or 4.

In examples 3 to 8 the silicon compounds used permit a large degree of variability in the control and influence on the properties of the material. In addition to the proportion of solid matter, the silicon compounds can influence mechanical properties, such as the impact resistance of the composite. The functional groups (e.g. polymerisable double-bonds) which are present in relatively large numbers, ensure a good bond with the filler in the resin or composite.

For example, by means of a long-chained methylene chain between the Si portion and the functional group (C=C-double bond), more flexible bonding and a reduced E module and a larger thermal coefficient of expansion can be attained than is possible with a shorter chain between the silicon portion and the functional group. Other modifications of the properties are possible, which can be produced to this extent by reagents known from prior art having only one functional group. Thus for example, an increased number of (meth)acrylate groups in contrast to few (meth)acrylate groups, brings about a larger modulus of elasticity (E module) and a smaller coefficient of thermal expansion. A larger number of alkoxy groups results in a larger modulus elasticity module and a smaller coefficient of thermal expansion.

The embodiment employing the monomer derived according to the general formulae I and II is discussed in detail in Examples 1 and 2. Such material can also be used to produce desired modification in the interior of the spherical particles according to the present invention. As depicted herein where the value a+b equals 0. Water glass solutions can also be used to bring about modification in the interior of spherical particles.

The spherical particles produced according to the present invention can also be obtained in situ by means of a one-pot synthesis process. If necessary, commercially available colloidal sols could be subjected in situ to organic surface modification while in a dispersed state by means of a multi-step one-pot synthesis. One such process as will be described in more detail in the following with reference to various variants. The modified particles can, then, be intermingled in various polymer matrices, in order to achieve specific properties in the desired for such as for example as refractive index, X-ray opacity, etc. for example. So-called matrices known under the commercial title OROMOCER are particularly preferred.

The particles produced according to the present invention will preferably have an onion-skin-like structure. In the resulting structure at least one additional oxide of the elements of the first to fifth main group and/or of the transitional metals forms a skin or layer in addition to that formed by $SnO_2$. Thus one or a plurality of skin-like oxide layers are formed concentrically about a centrally-located oxide core. Such a structure may be generated for example on the basis of a sol-gel process.

The particles may also be produced in an organic liquid. In such processes Sn is emulsified as a precipitable oxide (hydrate) either in a dissolved form or in the form of a sol in the aqueous phase and using an emulsifier. Precipitation f the $SnO_2$ hydrate or of other oxide (hydrates) in the emulsified water droplets can be carried out by a solution containing at least one material selected from quaternary ammonium, phosphonium and other onium compounds and salts of long-chained organic acids of selected compounds, before, during or after formation of the emulsion. During the precipitation process, the emulsifier is either present in the O or H form or being generated in situ, whereupon the water is removed by distillation.

The emulsifier of choice may be a non-ionic emulsifier and the compound of hydroxide ions causing the precipitation can be transported into the aqueous phase. For this purpose a quaternary ammonium salt, e.g. tetra (ar) aklylammonium halogenide can be preferably used.

By means of the emulsion process, small particles may be embedded in large particles. The matrix of the large particles consists of an oxide which is the same or different from that of the small particles in order to obtain a composite structure of the resulting particles. Such a structure can also be achieved if small particles grow on the large ones.

Particles with a homogeneous distribution of various oxides in the respective particle can be obtained by common hydrolysis and condensation with various metal oxide precursor (e.e. metalalcoholates, alkylcarbonyls).

The surface modification of the particles according to the invention as previously described can be achieved via a sol-gel process in situ or with various metallic compounds such as, for example, special silanes, which are condensed out after hydrolysis and condensation on the surface of the particles. As a result of this modification, the originally used particles have grown.

During surface modification of the spherical particles, the variation of the functional group in the organic portion can ensure that a favourable adaptation to the associated polymer matrix in which embedding is to take place is achieved. By altering the organic chain length between the functional group and the inorganic molecule portion adaptation of the intermingling flexibility in the matrix, in which the particles are to be mixed, is possible for example, by taking into account the modulus of elasticity, the tension reduction, etc. By altering the number of functional groups per reagent molecule, the intensity of interminglling in the matrix into which the particles are to be embedded, can be varied. A variation in the hydrolisable groups can lead to a situation in which the degree of bonding, i.e. the chemical bonding of the modifying reagents to the respective particles, becomes adjustable.

The particles formed and modified in accordance with the invention can be used advantageously for bulk materials, coatings films, fibres, electrophoretic deposits, in chromatography, as carriers for pharmacologically active substances, and in a variety of other areas. A particularly favourable use is the use as a filler, particularly in the dental field. An advantageous use of the particles with a modified surface embedded in a matrix, can allow corresponding parameters such as the modulus of elasticity, refractive index, impact resistance, X-ray opacity, coefficient of thermal expansion, and permeability to be exactly set and adapted to the respective purpose.

Like most elements with a high atomic weight, which also intensely absorb X-rays, tin also has this property. As X-ray opacity is also dependent in wavelength, tin, due to its high specific mass absorption coefficient, may be favourably used in the dental field. The X-ray apparatus employed has an acceleration voltage of 60 to 80 kV generate a wave length spectrum between 0.3 and $0.4*10^{-10}$ m.

The following table shows values for specific mass absorption coefficients for a plurality of elements at the wavelengths of interest, the values for tin contrasting clearly from most of the others and therefore rendering use as a dental compound particularly valuable. With knowledge of this specific mass absorption and the mass proportion in the solid body, the X-ray absorption can be calculated and adjusted or taken into account as required.

| Element | Wavelength 2 $0.3 * 10^{-10}$ | Wavelength 2 $0.4 * 10^{-10}$ |
|---|---|---|
| Sn | 19.0 | 39.5 |
| Si | 0.66 | 1.32 |
| Ti | 2.1 | 4.69 |
| Zr | 10.9 | 24.0 |
| Al | 0.55 | 1.08 |
| V | 2.38 | 5.34 |
| Nb | 11.7 | 25.5 |
| Y | 10.2 | 22.5 |
| Sr | 9.5 | 21.0 |
| Rb | 8.84 | 19.6 |
| Sb | 19.8 | 40.8 |

The various properties of tin and tin compounds are extremely varied. This also applies to toxicity. Thus $SnO_2$ is chemically resistant and harmless. It can be used for many applications, such for example as a dye pigment, flame-retardant agent, electrode material, or insulation agent.

On the other hand, organic tin compounds are not so stable in the face of thermal and chemical influences. These compounds do have fungicidal and bactericidal effects. These compounds are present after hydrolysis and condensation in a bonded form in the particles. They are thus chemically bonded to the particles and can no longer diffuse out of the bond in the interior. The bactericidal and fungicidal property previously present are no longer active. Use as a dental filler material is possible without difficulty.

In the case of coatings and particularly with dental materials however, a certain degree of contact toxicity can be desirable. This property is particularly valuable for edges and fissures. In this case such elements or compounds are toxic only on direct contact, and bacteria can be killed upon contact. In addition to amalgam, organic Sn compounds also have this property.

Contact toxicity is however only present in particles which have the compound on the surface, as diffusion from the interior does not occur due to the secure bond. Particles can be made available in which the contact toxicity can be adjusted in a controlled manner by means of various methods.

Thus contact toxicity exists with an onion-skin-like structure, if Sn is present in the outer skin region. If particles are generated with homogenous distribution or embedded in a matrix, this leads, with an Sn content, likewise to a certain degree of contact toxicity.

The high contents of solid matter achieved in the particles indicates that shrinkage can be reduced with the aid of bi-, tri and polymodal distributions of particle size. In addition, the particles according to the invention may also however be used for various optical, electro-optical and opto-electronic applications.

The invention will be described in more detail in the following with reference to examples of synthesis.

EXAMPLES OF SYNTHESIS

Example 1

Commercially available $SnO_2$ particles in dispersion (average size about 15 nm) were diluted with the aid of distilled water, filtered and adjusted by means of methanol to a concentration of 0.1% by weight of $SnO_2$. 124 mg of 3-methacryloxypropyl trimethoxysilane per g of $SnO_2$ were added by stirring to the sol which was heated to 40+/−0.1° C., and stirred for 1 hour, in the presence of an optional catalyst.

TEM: about 15 nm (particle diameter after modification), DRIFT-spectroscopy: $V_{(c-o)}$=7120 to 1725 cm$^{-1}$, Example 2

Commercially available $SnO_2$ particles in dispersion (average size about 15 nm) were diluted with distilled water, filtered and adjusted to a concentration of 1.0 weight % $SnO_2$. 111 mg of 3-aminopropyl triethoxysilane per g of $SnO_2$ were added by stirring to the sol heated to 40±0.1° C., a catalyst if necessary being usable. The resultant gel was transferred again into a colloidal solution by the addition of acetic acid and heating at 95° C. for 2 hours.

TEM: about 15 nm (particle diameter after modification), Zeta-potential-measurements: displacement of the isoelectric point from an initial $pH_{IEP}$=3.6 ($SnO_2$) to a $pH_{IEP} \geq 8$ after surface modification.

Example 3

A colloidal solution was produced from 1.50 g (10.0 mmol) of commercially available $SnO_2$ (particle size about 15 nm), 3120 g (67.8 mol) ethanol, 67.0 g (3.9 mol) ammonia and 675 g (37.5 mol) distilled water. After filtration, 50.0 g (0.24 mol) of tetraethoxysilane were added with intensive stirring to the sol heated to 40±0.1° C. 5.6 g (15.0 mmol) of the alcoxysilane formula 1 was added once to the mixed oxide sol thus obtained.

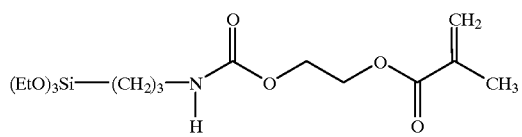

I

TEM: about 44 nm (particle diameter after modification), DRIFT-spectroscopy $V_{(c-o)}$=1720 to 1725 cm$^{-1}$.

X-ray fluorescence analysis confirms that the ratio of Si to Sn coincides with the corresponding ratio in the initial compounds.

Example 4

A colloidal solution was produced from 1.50 g (10.0 mmol) of commercially available $SnO_2$, (particle size about 15 nm), 3120 g (67.8 mol) ethanol, 67.0 g (3.9 mol) ammonia and 675 g (37.5 mol) distilled water. After filtration, 100.0 g (0.24 mol) of tetraethoxysilane were added to the sol heated to 40±0.1° C. within 48 hours. 4.8 g (10.0 mmol) of the alkoxysilane formula II was added once to the oxide sol thus obtained.

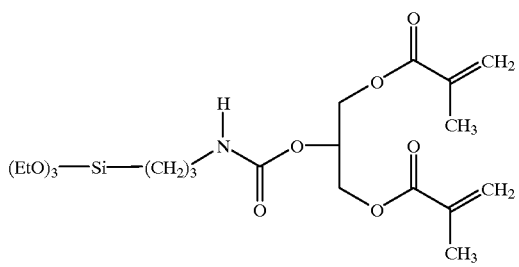

II

TEM: about 53 nm (particle diameter after modification), DRIFT-spectroscopy: $v_{(c-o)}$=1720 to 1725 cm$^{-1}$.

X-ray fluorescence analysis confirms that the ratio of Si to Sn coincides with the corresponding ratio in the initial compounds.

Example 5

A colloidal solution was produced from 1.50 g of commercially available Sb-Sn-O mixed oxide particles (particles size about 15 nm), 3120 g (67.8 mol) ethanol, 67.0 g (3.9 mol) ammonia and 675 (37.5 mol) distilled water. After filtration, 50.0 g (0.224 mol) of tetraethoxysilane were added to the sol and heated to 40±0.1° C. for 24 hours. 5.6 g (15.0 mmol) of the alcoxysilane formula 1 were added to the mixed oxide sol thus obtained.

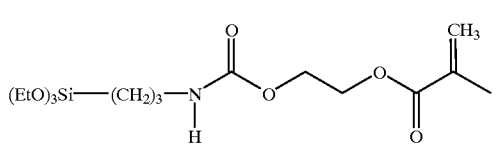

II

TEM: about 44 nm (particle diameter after modification), DRIFT-spectroscopy: $V_{(c-o)}$=720 t 1725 cm$^{-1}$, X-ray fluorescence analysis confirms that the ratio of Si to Sn and Sb coincides with the corresponding ratio in the initial compounds.

Example 6

16.1 g (50.0 mmol) ZrOCl$_2$.8 H$_2$O and 17.5 g (50.0 mmol) SnCl$_4$.5 H$_2$O were dissolved in 110 ml water and mixed with 3.4 g (13.7 mmol) 3-methacryloxypropyl trimethoxysilane in 375 mol petroleum ether (boiling range 50 to 70° C.) and 1.5 g emulsifier. The emulsion was then carried out by means of an Ultraturrax. 1 Mol % didodecyldimethyl ammonium bromide, in relation to the quantity of anions to be exchanged, were dissolved in oxtanol with a concentration of 1 g/5 ml and emulsified. The ion exchange was effected by means of an intensely basic ion exchange (Dowex). The exchange was continuously 100% by volume butanol, in relation to the overall quantity of water, were emulsified. After azeotropic distillation, the particles were isolated, redispersed in petroleum ether and dried.

X-ray fluorescence analysis confirms that the ratio of Zr to Sn in the spherical particles indicated by means of TEM coincides with the corresponding ratio in the initial compounds.

What is claimed is:

1. Spherical particles comprising:
   a material selected from the group consisting of SnO$_2$ and SnO$_2$, together with at least one further oxide of elements selected from the group consisting of materials selected from the group consisting of alkali metals, alkaline earth metals, elements from the boron group, elements from the carbon group, elements from the nitrogen group, transitional metals, and mixtures thereof wherein the particles have a SnO$_2$ content between 0.1 and 99.9% by weight,
   the particles having a size between 5 and 10,000 nm and wherein the particles have a surface modification which has been obtained by at least partial hydrolytic condensation of at least one hydrolytically condensable compounds of silicon and at least one element selected from the group consisting of B, Al, P, Sn, Pb, transitional metals, lanthanides, actinides, and precondensates derived from the abovenamed compounds by action of water or moisture.

2. The spherical particles according to claim 1, wherein the at least one further oxide of elements contains organic groups.

3. The spherical particles according to claim 1, wherein the SnO$_2$ content of the particles is in a range between 10 to 90% by weight.

4. The spherical particles according to claim 1, wherein the particles comprise SnO$_2$ and at least one further oxide of elements selected from the group consisting of materials of alkali metals, alkaline earth metals, boron group elements, carbon group elements, nitrogen group elements, transitional metals, and mixtures thereof, wherein the particles have a concentric layered structure.

5. The spherical particles according to claim 1, wherein the particles comprises SnO$_2$ and at least one further oxide of elements selected from the group consisting of materials of the first to fifth main group, transitional metals, and mixtures thereof, wherein the particles have a homogenous distribution of the oxides.

6. The spherical particles according to claim 1, wherein the particles comprise SnO$_2$ and at least one further oxide of elements is the elements selected from the group consisting of materials of the first to fifth main group, transitional metals, and mixtures thereof, wherein particles of at least one of the oxides are embedded in a matrix of at least one of the oxides.

7. The spherical particles according to claim 1, wherein the hydrolytic condensation took place in presence of a catalyst and/or a solvent.

8. The spherical particles according to claim 1, wherein one or a plurality of the hydrolytically condensed metal compounds are derived from monomers of the general formula I, $$R_a(Z'R'')_b MX_{c-(a+b)} \quad (I)$$

wherein radicals and indices have the following meaning:
R=an alkyl, alkenyl, aryl, alkylaryl, or arylalkyl;
R''=an alkylene or alkenylene compounds capable of optionally containing oxygen-, sulphur atoms and/or amino groups;
X=hydrogen, halogen, hydroxy, alkoxy, acyloxy, alkylcarbonyl, alkoxycarbonyl or NR'$_2$, with R'=hydrogen, alkyl or aryl;
Z'=halogen or, optionally, a substituted amino-, amide-, aldehyde-, alkylcarbonyl-, carboxy-, mercapto-, cyano-, alkoxy-, alkoxycarbonyl-, sulphonic acid-, phosphoric acid-, acryloxy-, methacryloxy-, epoxy- or vinyl group;
a=an integer 0, 1, 2, 3, 4, 5, 6 or 7;
b=an integer 0, 1, 2, 3, 4, 5, 6 or 7 with a+b=1, 2, 3, 4, 5, 6 or 7;
c=an integer 1, 2, 3, 4, 5, 6, 7 or 8; and
M=elements of Group IA, Group IIA, Group IIIA, Group IVA, Group VA, or of the transitional metals.

9. The spherical particles according to claim 1, wherein at least one of the hydrolytically condensed Sn compounds are derived from monomers of the general formula II, $$Ra(Z'R'')_b SnX_{c-(a+b)} \quad (II)$$

wherein radicals and indices have the following meaning:
R=an alkyl, alkenyl, aryl, alkylaryl, or arylalkyl;
R''=alkylene, or alkenylene radicals optionally containing oxygen-, sulphur atoms and/or amino groups;
X=hydrogen, halogen, hydroxy alkoxy, acyloxy, alkylcarbonyl, alkoxycarbonyl or NR'$_2$, with R'=hydrogen, alkyl or aryl;

Z'=halogen or, optionally, a substituted amino-, amide-, aldehyde-, alkylcarbonyl-, carboxy-, mercapto-, cyano-, alkoxy-, alkoxycarbonyl-, sulphonic acid-, phosphoric acid, acryloxy-, methacryloxy-, epoxy- or vinyl group;
a=an integer 0, 1, 2, or 3;
b=an integer 0, 1, 2, or 3 with a+b=1, 2, or 3; and
c=an integer 2 or 4.

10. The spherical particles according to claim 1, wherein at least one of the hydrolytically condensed, surface modified Si compounds are derived from monomers of having a general formula:

$$R_a(Z'R'')_b SiX_{c-(a+b)} \quad (III)$$

wherein radicals and indices have the following meaning:
R=an alkyl, alkenyl, aryl, alkylaryl, or arylalkyl
R''=an alkylene, or alkenylenes radicals optionally containing oxygen-, sulphur atoms and/or amino groups,
X=hydrogen, halogen, hydroxy, alkoxy, acyloxy, alkylcarbonyl, alkoxycarbonyl or NR'$_2$, with R'=hydrogen, alkyl or aryl,
Z'=halogen or, optionally, a substituted amino-, amide-, aldehyde-, alkylcarbonyl-, carboxy-, mercapto-, cyano-, alkoxy-, alkoxycarbonyl-, sulphonic acid-, phosphoric acid-, acryloxy-, methacryloxy-, epoxy- or vinyl group
a=an integer 0, 1, 2, or 3,
b=an integer 0, 1, 2, or 3 with a+b=1, 2, or 3,
c=an integer 2 or 4.

11. The spherical particles according claim 1, wherein at least one of the hydrolytically condensed surface modified Si compounds are derived from monomers of the general formula:

$$(X_a R_b Si\{R'A\}_c)_{(4-2-b)})_x B \quad (IV)$$

wherein radicals and indices are equal or different and have the following meaning:
A=O, S, PR'', POR'', NHC(O)O or NHC(O)NR'',
B=a straight-chained or branched organic residue, derived from a compound B' with at least one C=C double bond, when c=1 and A=NCH(O)O or NHC(O)NR'' or at least two C=C double bonds and 5 to 50 carbon atoms,
R=an alkyl, alkenyl, aryl, alkylaryl or arylalkyl,
R'=an alkylene, arylene or alkylenearylene,
R''=hydrogen, alkyl or aryl,
X=hydrogen, halogen, hydroxy, alkoxy, acyloxy, alkylcarbonyl, alkoxycarbonyl or NR''$_2$,
a=an integer 1, 2 or 3,
b=an integer 0, 1 or 2, c=0 or 1,
x=a whole number, whose maximum value corresponds to the number of double bonds in the compound B' minus 1, or is equal to the number of double bonds in the compound B', if c=1 and A stands for NHC(C)O or NHC(O)NR'',
wherein the alkyl- or alkenyl are, optionally, substituted straight-chained, branched or cyclic radicals with 1 to 20 carbon atoms, the radicals capable of containing oxygen-, sulphur-atoms and/or amino-groups, aryl standing for, if necessary, substituted phenyl, naphthyl or biphenyl and the above alkoxy-, acyloxy-, alkyl carbonyl-, alkoxy carbonyl-, alkylaryl-, arylalkyl-, arylene-, alkylene and alkylene aryl residues deriving from the above-defined alkyl- and aryl residues.

12. The spherical particles according claim 1, wherein at least one of the hydrolytically condensed surface modified Si compounds are derived from monomers of the general formula:

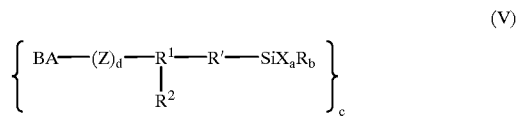

$$\left\{ BA-(Z)_d-R^1-R'-SiX_aR_b \atop {|\atop R^2}\right\}_c \quad (V)$$

wherein radicals and indices are equal or different and having the following meaning:
B=a straight-chained or branched organic radical with at least one C=C double bond and 4 to 50 carbon atoms;
X=hydrogen, halogen, hydroxy, alkoxy, acyloxy, alkycarbonyl, alkoxycarbonyl or NR''$_2$;
R=an alkyl, alkenyl, aryl, alkylaryl or arylalkyl;
R'=an alkylene, arylene, arylene alkylene or alkylene arylene groups having 0 to 10 carbon atoms, these radicals optionally containing oxygen-, sulphur atoms and/or amino groups;
R''=hydrogen, alkyl or aryl;
wherein
A=O, S or NH when d=1 and X=CO, and
R$^1$=optionally oxygen, sulphur atoms and/or alkylene, arylene or alkylene arylene containing amino groups, containing 1 to 10 carbon atoms, and
R$^2$=H or COOH; or
A=O, S, NH or COO for
d=0 to 1 and
Z=CHR, with R=H alkyl, aryl or alkylaryl, and
R$^1$=optionally oxygen-, sulphur atoms and/or alkylene, arylene or alkylene arylene containing amino groups, having 1 to 10 carbon atoms and
R$^2$=OH; or
A=S for
d=1 and
Z=CO and
R$^1$=N and
R$^2$=H;
a=1, 2 or 3;
b=0, 1 or 2, with a+b=3;
c=1, 2, 3 or 4.

13. The spherical particles according claim 1, wherein at least one of the hydrolytically condensed surface modified Si compounds are derived from monomers of the general formula:

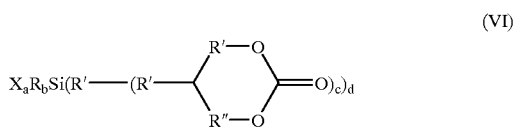

$$X_a R_b Si(R'-(R'- \underset{R''-O}{\overset{R'-O}{<}} =O)_c)_d \quad (VI)$$

X=hydrogen, halogen, hydroxy, alkoxy, acyloxy, alkylcarbonyl, alkoxylcarbonyl or NR$^2$$_2$;
R=an alkyl, alkenyl, aryl, alkylaryl or arylalkyl;
R'=optionally an alkylene, arylene, arylene alkylene or alkylene arylene having 1 to 10 carbon atoms, said radical optionally containing oxygen-, sulphur atoms and/or amino groups;
R''=an alkylene, arylene, arylene alkylene or alkylene arylene having 1 to 10 carbon atoms, wherein these radicals optionally containing oxygen-, sulphur atoms and/or amino-groups;
R$^2$=hydrogen, alkyl or aryl;

a=an integer 1, 2 or 3;
b=an integer 0, 1 or 2, with a+b=1, 2 or 3;
c=an integer 1, 2, 3, 4, 5 or 6;
d=4−a−b.

14. The spherical particles according claim 1, wherein at least one of the hydrolytically condensed surface modified Si compounds are derived from monomers of the general formula:

$$Y_nSiX_mR_{4-(n+m)} \qquad (VII)$$

wherein the radicals are equal or different and have the following meaning:
R=alkyl, alkenyl, aryl, alkylaryl or arylalkyl,
X—hydrogen, halogen, hydroxy, alkoxy, acyloxy, alkylcarbonyl, alkoxycarbonyl or NR'$_2$; with R'=hydrogen, alkyl or aryl,
Y=a substituent, containing a substituted or unsubstituted 1,4,6-trioxaspiro (4,4)-nonane residue;
n=an integer 1, 2 or 3,
m=an integer 1, 2 or 3, with n+m≦4.

15. The spherical particles according to claim 1, wherein at least one of the hydrolytically condensed surface modified Si compounds are derived from monomers of the general formula:

(VIII)

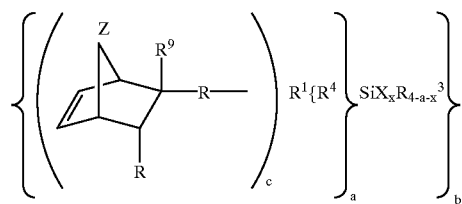

wherein radicals and indices have the following meaning:
R=hydrogen, R$^2$—R$^1$—R$^4$—SiX$_x$R$^3_{3-x}$1, carbon-, an alkyl, alkenyl, aryl, alkylaryl or arylalkyl having 1 to 15 hydrocarbon atoms, wherein these optionally containing oxygen or sulphur atoms, ester, carbonyl, amide or amino groups;
R$^1$=an alkylene, arylene, arylene alkylene or alkylarylene having 1 to 15 carbon atoms, these radicals optionally containing oxygen- or sulphur atoms, ester, carbonyl, amide or amino groups;
R$^2$=optionally an alkylene, arylene, arylene alkylene or alkylarylene having 1 to 15 carbon atoms, these radicals optionally containing oxygen or sulphur atoms, ester, carbonyl, amide or amino groups;
R$^3$=an alkyl, alkenyl, aryl, alkylaryl or arylalkyl having 1 to 15 carbon atoms, these radicals optionally containing oxygen or sulphur atoms, ester, carbonyl, amide or amino groups;
R$^4$=—(—CHR$^6$—CHR$^6$)$_n$—, with n=0 or 1, —CHR$^6$—CHR$^{6-}$S—R$^5$—, —CO—S—R$^5$—, CHR$^6$—CHR$^6$—NR$^6$—R$^5$, —Y—CS—NH—R$^6$—, —S—R$^5$, —Y—CO—NH—R$^5$,—, —CO—O—R$^5$—, —Y—CO—C$_2$H$_3$(COOH)—R$^5$—, —Y—CO—C$_2$H$_3$(OH)—R$^5$— or —Co—NR$^6$—R$^5$—;
R$^5$=an alkylene, arylene, arylene alkylene or alkylarylene having 1 to 15 carbon atoms, these radicals optionally containing oxygen or sulphur atoms, ester, carbonyl, amide or amino groups;
R$^6$=hydrogen, alkyl or aryl having 1 to 10 carbon atoms;

R$^9$=hydrogen, alkyl, alkenyl, aryl, alkylaryl or arylalkyl having 1 to 15 carbon atoms, these radicals optionally containing oxygen or sulphur atoms, ester, carbonyl, amide or amino groups;
X=hydrogen, halogen, hydroxy, alkoxy, acyloxy, alkylcarbonyl, alkoxycarbonyl or NR"$_2$, with R"=hydrogen, alkyl or aryl;
Y=—O—, —S— or —NR$^6$—;
Z=—O— or —(CHR$^6$)$_m$—, with m=1 or 2;
a=an integer 1, 2 or 3, with b=1 for a=2 or 3;
b=an integer 1, 2 or 3, with a=1 for b=2 or 3;
c=an integer 1 to 6;
x=an integer 1, 2 or 3;
wherein a+x=2, 3 or 4.

16. The spherical particles according to claim 1, wherein the particles are modified in an interior of the particles with at least one of the hydrolytically condensed metal compounds which are derived from monomers of the general formula:

$$R_a(A'R")_bMX_{c-(a+b)} \qquad (I)$$

or

$$R_a=(Z'R")_bSnX_{c-(a+b)} \qquad (II)$$

wherein the indices having the following meaning:
a=an integer 0, 1, 2 or 3;
b=an integer 0, 1, 2, or 3 with a+b=1, 2, or 3; and
c=an integer 2, 4,
provided that a+b can also equal 0.

17. A method of manufacturing spherical particles made from a material selected from the group consisting of SnO$_2$ or SnO$_2$ together with at least one further oxide of elements selected from the group consisting of materials of the first to fifth main group, transitional metals, and mixtures thereof, wherein a SnO$_2$ content of the particles is between 0.1 and 99.9% by weight, the particles having a size between 5 and 10,000 nm and modified by organic groups, the method comprising:
applying at least one layer of a material selected from the group consisting of a metal oxide or mixtures metal oxides to spherical metal oxide particles, said application occurring by hydrolytic condensation of at least one hydrolytical condensable compound selected from the group consisting of Si, B, Al, P, Sn, or Pb, transitional metals, lanthanides and actinides, and precondensates derived from the abovenamed compounds, wherein said hydrolytic condensation occurs by action of water or moisture.

18. The method according to claim 17, wherein the hydroltytic condensation takes place in presence of a catalyst and/or a solvent.

19. The method according to claim 18 wherein condensation takes place in presence of a catalyst and/or a solvent.

20. The method according to claim 18, wherein at least one of the hydrolytically condensed Sn compounds of the modification are derived from monomers of the general formula:

$$R_a(Z'R")_bSnX_{c-(a+b)} \qquad (II)$$

wherein radicals and indices are equal or different and as defined as follows:
R=an alkyl, alkenyl, aryl, alkylaryl, or arylalkyl;
R"=alkylene, or alkenylene radicals capable of containing oxygen-, sulphur atoms and/or amino groups;

X=hydrogen, halogen, hydroxy alkoxy, acyloxy, alkylcarbonyl, alkoxycarbonyl or NR'$_2$, with R'=hydrogen, alkyl or aryl;

Z'=halogen or substituted amino-, amide-, aldehyde-, alkylcarbonyl-, carboxy-, mercapto-, cyano-, alkoxy-, alkoxycarbonyl-, sulphonic acid-, phosphoric acid, acryloxy-, methacryloxy-, epoxy- or vinyl group;

a=an integer 0, 1, 2, or 3;

b=an integer 0, 1, 2, or 3 with a+b=1, 2, or 3; and c=an integer 2 or 4.

21. The method according to claim 18, wherein at least one hydrolytically condensed Si compound of the surface modification are derived from monomers of the general formula:

$$(X_aR_bSi\{(R'A)_c\}_{(4-a-b)})_xB \qquad (IV)$$

the radicals and indices being equal or different and defined as follows:

A=O, S, PR", POR", NHC(O)O or NHC(O)NR",

B=a straight-chained or branched organic residue, derived from a compound B' with at least one C=C double bond, when c=1 and A=NCH(O)O or NHC(O)NR" or at least two C=C double bonds and 5 to 50 carbon atoms, R=an alkyl, alkenyl, aryl, alkylaryl or arylalkyl, R'=an alkylene, arylene or alkylenearylene, R"=hydrogen, alkyl or aryl, X=hydrogen, halogen, hydroxy, alkoxy, acyloxy, alkylcarbonyl, alkoxycarbonyl or NR"$_2$, a=an integer 1, 2 or 3, b=an integer 0, 1 or 2, c=0 or 1, x=a whole number, whose maximum value corresponds to the number of double bonds in the compound B' minus 1, or is equal to the number of double bonds in the compound B', if c=1 and A stands for NHC(C)O or NHC(O)NR", wherein the alkyl- or alkenyl are, optionally, substituted straight-chained, branched or cyclic radicals with 1 to 20 carbon atoms, the radicals capable of containing oxygen-, sulphur-atoms and/or amino-groups, aryl standing for, if necessary, substituted phenyl, naphthyl or biphenyl and the above alkoxy-, acyloxy-, alkyl carbonyl-, alkoxy carbonyl-, alkylaryl-, arylalkyl-, arylene-, alkylene and alkylene aryl residues deriving from the above-defined alkyl- and aryl residues.

22. The method according to claim 18, wherein at least one hydrolytically condensed Si compounds of the surface modification are derived from monomers of the general formula:

$$B\left\{A-(Z)_d-\underset{R^2}{\overset{R^1}{|}}-R'-SiX_aR_b\right\}_c$$

wherein radicals and indices are equal or different and defined as follows:

B=a straight-chained or branched organic radical with at least one C=C double bond and 4 to 50 carbon atoms;

X=hydrogen, halogen, hydroxy, alkoxy, acyloxy, alkycarbonyl, alkoxycarbonyl or NR"$_2$;

R=an alkyl, alkenyl, aryl, alkylaryl or arylalkyl;

R'=optionally an alkylene, arylene, arylene alkylene or alkylene arylene groups having 1 to 10 carbon atoms, these radicals optionally containing oxygen-, sulphur atoms and/or amino groups;

R"=hydrogen, alkyl or aryl;

wherein

A=O, S or NH when d=1 and CO, and d=1 and

X=CO and

R$^1$=if necessary oxygen, sulphur atoms and/or alkylene, arylene or alkylene arylene containing amino groups, containing 1 to 10 carbon atoms, and R$^2$=H or COOH; or A=O, S, NH or COO for d=0 to 1 and Z=CHR, with R=H alkyl, aryl or alkylaryl, and R$^1$=if necessary oxygen-, sulphur atoms and/or alkylene, arylene or alkylene arylene containing amino groups, having 1 to 10 carbon atoms and R$^2$=OH; or A=S for d=1 and Z=CO and R$^1$=N and

R$^2$=H;

a=1, 2 or 3;

b=0, 1 or 2, with a+b=3;

c=1, 2, 3 or 4.

23. The method according claim 18, wherein at least one the hydrolytically condensed Si compounds of the surface modification are derived from monomers of the general formula:

$$X_aR_bSi(R'-\!\!-\!\!(R'-\!\!\overset{R'-O}{\underset{R''-O}{\diagdown\!\!\diagup}}=\!O)_c)_d \qquad (VI)$$

wherein radicals and indices are equal or different and are defined as follows:

X=hydrogen, halogen, hydroxy, alkoxy, acyloxy, alkylcarbonyl, alkoxylcarbonyl or NR$^2_2$;

R=an alkyl, alkenyl, aryl, alkylaryl or arylalkyl;

R'=optionally an alkylene, arylene, arylene alkylene or alkylene arylene having 1 to 10 carbon atoms, said radical capable of containing oxygen-, sulphur atoms and/or amino groups;

R"=an alkylene, arylene, arylene alkylene or alkylene arylene 1 to 10 carbon atoms, wherein these radicals are capable of containing oxygen-, sulphur atoms and/or amino-groups;

R$^2$=hydrogen, alkyl or aryl;

a=an integer 1, 2 or 3;

b=an integer 0, 1 or 2, with a+b =1, 2 or 3;

c=an integer 1, 2, 3, 4, 5 or 6;

d=4−a−b.

24. The method according to claim 17, wherein at least one hydrolytically condensed Si compound of the surface modification is derived from monomers of the general formula:

$$Y_nSiX_mR_{4-(n+m)} \qquad (VII)$$

wherein radicals X, Y and R are equal or different and are defined as follows:

R=alkyl, alkenyl, aryl, alkylaryl or arylalkyl,

X=hydrogen, halogen, hydroxy, alkoxy, acyloxy, alkylcarbonyl, alkoxycarbonyl or NR'$_2$; with R'=hydrogen, alkyl or aryl, Y=a substituent, containing a substituted or unsubstituted 1,4,6-trioxaspiro (4,4)-nonane residue;
n=an integer 1, 2 or 3,
m=an integer 1, 2 or 3, with n+m≦4.

25. The method according to claim 18, wherein at least one hydrolytically condensed Si compound of the surface modification is derived from monomers of the general formula:

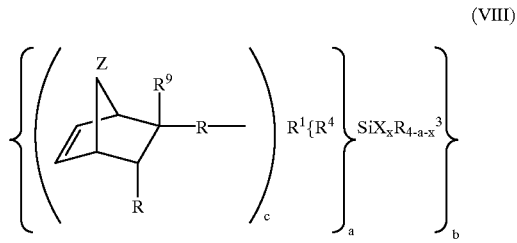

(VIII)

wherein radicals and indices are equal or different and are as defined;

R=hydrogen, $R^2-R^1-R^4-SiX_xR^3_{3-x}1$, carbon-, an alkyl, alkenyl, aryl, alkylaryl or arylalkyl having 1 to 15 hydrocarbon atoms, wherein these optionally containing oxygen or sulphur atoms, ester, carbonyl, amide or amino groups;

$R^1$=an alkylene, arylene, arylene alkylene or alkylarylene having 0 to 15 carbon atoms, these radicals capable of containing oxygen- or sulphur atoms, ester, carbonyl, amide or amino groups;

$R^2$=an alkylene, arylene, arylene alkylene or alkylarylene having 0 to 15 carbon atoms, these radicals capable of containing oxygen or sulphur atoms, ester, carbonyl, amide or amino groups;

$R^3$=an alkyl, alkenyl, aryl, alkylaryl or arylalkyl having 1 to 15 carbon atoms, these radicals capable of containing oxygen or sulphur atoms, ester, carbonyl, amide or amino groups;

$R^4$=—(—$CHR^6$—$CHR^6$)$_n$—, with n=0 or 1, —$CHR^6$—$CHR^6$-S—$R^5$—, —CO—S—$R^5$—, $CHR^6$—$CHR^6$—$NR^6$—$R^5$, —Y—CS—NH—$R^6$—, —S—$R^5$, —Y—CO—NH—$R^5$,—, —CO—O—$R^5$—, —Y—CO—$C_2H_3$(COOH)—$R^5$—, —Y—CO—$C_2H_3$(OH)—$R^5$— or —Co—$NR^6$—$R^5$—;

$R^5$=an alkylene, arylene, arylene alkylene or alkylarylene having 1 to 15 carbon atoms, these radicals capable of containing oxygen or sulphur atoms, ester, carbonyl, amide or amino groups;

$R^6$=hydrogen, alkyl or aryl having 1 to 10 carbon atoms;

$R^9$=hydrogen, alkyl, alkenyl, aryl, alkylaryl or arylalkyl having 1 to 15 carbon atoms, these radicals capable of containing oxygen or sulphur atoms, ester, carbonyl, amide or amino groups;

X=hydrogen, halogen, hydroxy, alkoxy, acyloxy, alkylcarbonyl, alkoxycarbonyl or NR"$_2$, with R"=hydrogen, alkyl or aryl;

Y=—O—, —S— or —$NR^6$—;
Z=—O— or —($CHR^6$)$_m$—, with m=1 or 2;
a=an integer 1, 2 or 3, with b=1 for a=2 or 3;
b=an integer 1, 2 or 3, with a=1 for b=2 or 3;
c=an integer 1 to 6;
x=an integer 1, 2 or 3;
wherein a+x=2, 3 or 4.

26. A method of manufacturing spherical particles made from a material selected from the group consisting of $SnO_2$ or $SnO_2$ together with at least one further oxide of elements selected from the group consisting materials of the first to fifth main group transitional metals and mixtures thereof, wherein $SnO_2$ content of the particles is between 0.1 and 99.9% by weight, the particles having a size between 5 and 10,000 nm and modified by organic groups, the method comprising:

emulsifying at least Sn contained as a precipitable oxide (hydrate) in dissolved from or in the form of a sol in an aqueous phase using an emulsifier in an organic liquid; and bringing about precipitation of the resulting $SnO_2$ hydrate in emulsified water droplets by a solution containing a material selected from the group consisting of quaternary ammonia, phosphonium, other onium compounds with salts of long-chain organic acids of selected compounds, before, during or after the formation of the emulsion, a relevant compound either already existing in the OH or H form or being generated in situ, whereupon the water is removed by distillation.

27. Spherical particles comprising:

a material selected from the group consisting of $SnO_2$ and $SnO_2$, together with at least one further oxide of elements selected from the group consisting of materials selected from the group consisting of alkali metals, alkaline earth metals, elements from the boron group, elements from the carbon group, elements from the nitrogen group, transitional metals, and mixtures thereof wherein the particles have a $SnO_2$ content between 0.1 and 99.9% by weight, the particles having a size between 5 and 10,000 nm and wherein the particles have a surface modification which has been obtained by at least partial hydrolytic condensation of at least one hydrolytically condensable compounds of silicon and at least one element selected from the group consisting of B, Al, P, Sn, Pb, transitional metals, lanthanides, actinides, and precondensates derived from the abovenamed compounds by action of water or moisture wherein the spherical particles are mixed with a filler, the filler amount being between 30 and 98% by weight.

* * * * *